Sept. 1, 1931. E. E. VON TELL 1,821,595
COVER FOR SHIPS' HATCHWAYS
Filed Jan. 21, 1931 6 Sheets-Sheet 3
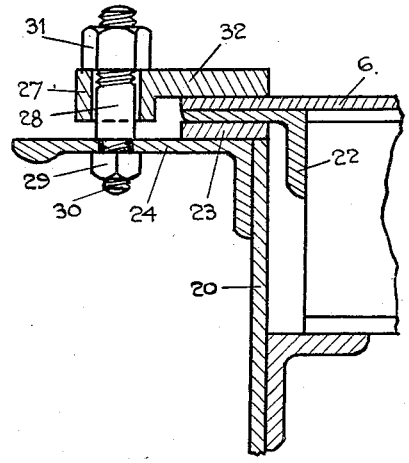
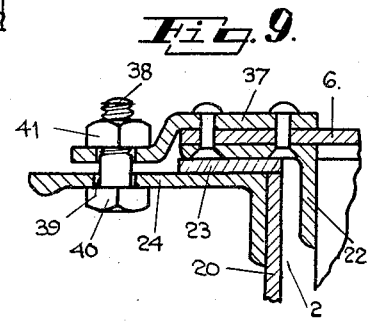
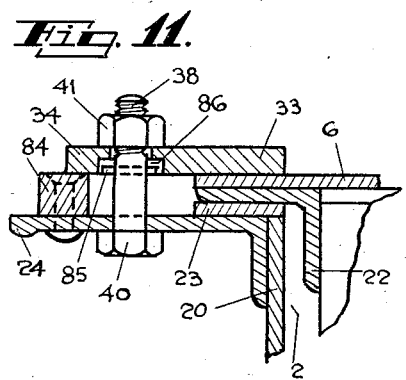
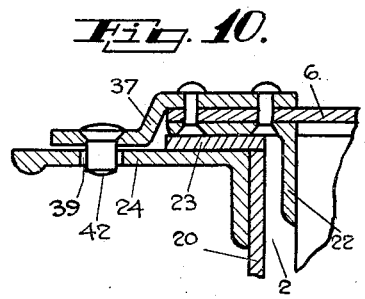
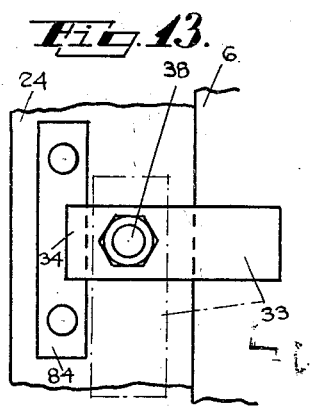
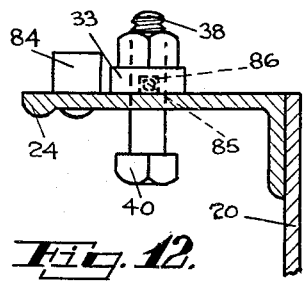
INVENTOR.
E. E. Von Tell
BY Marks & Clerk
ATTORNEYS.

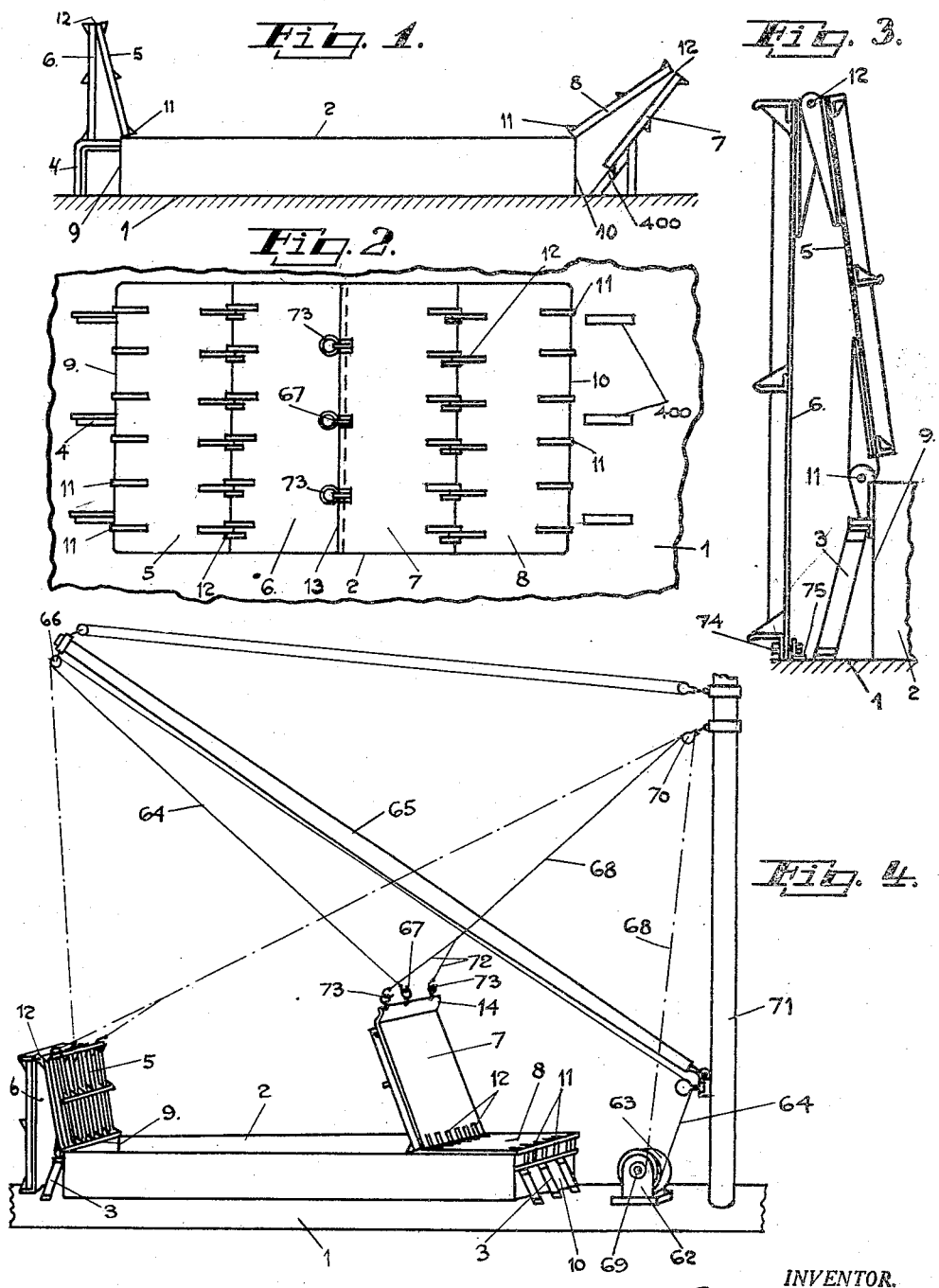

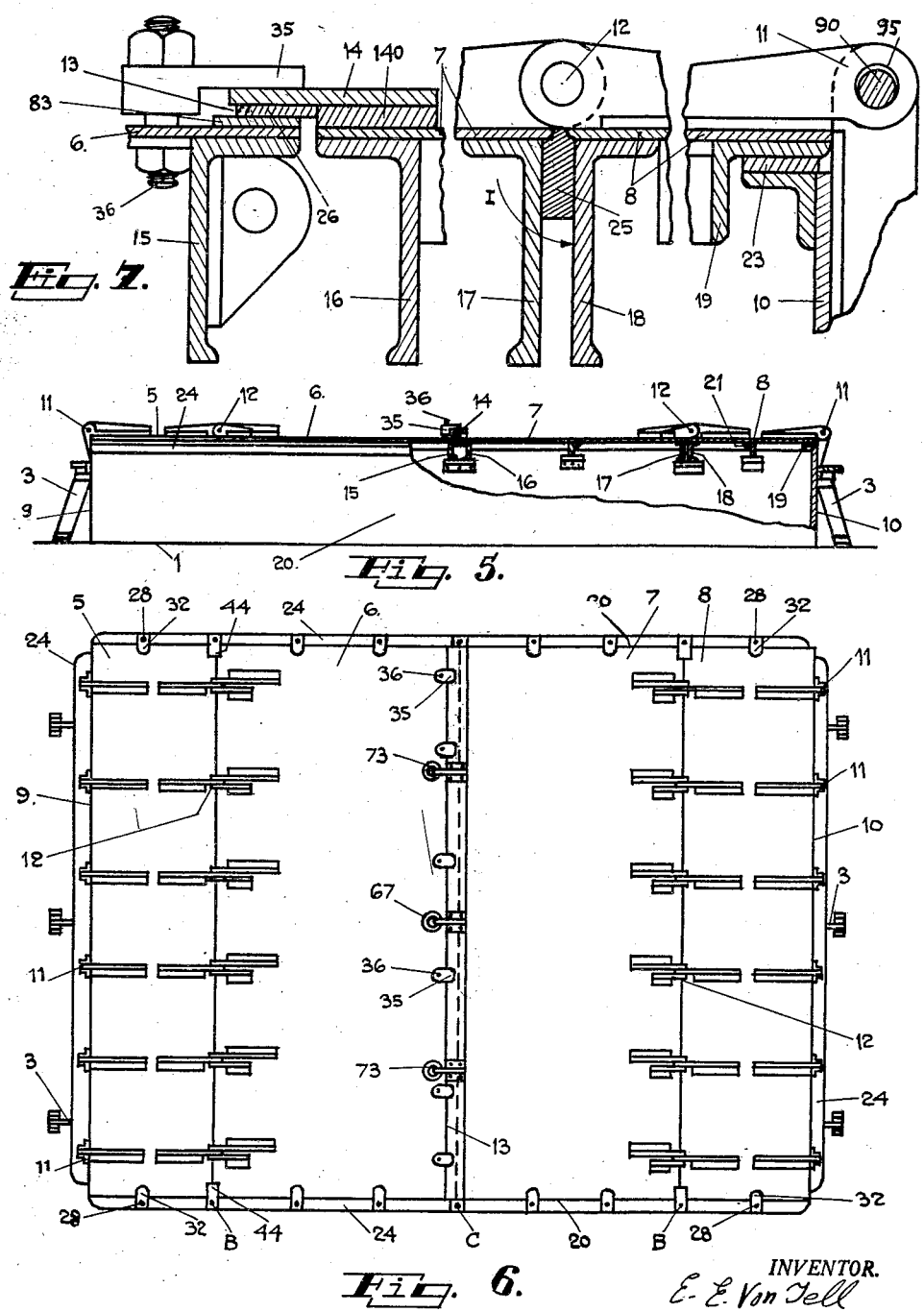

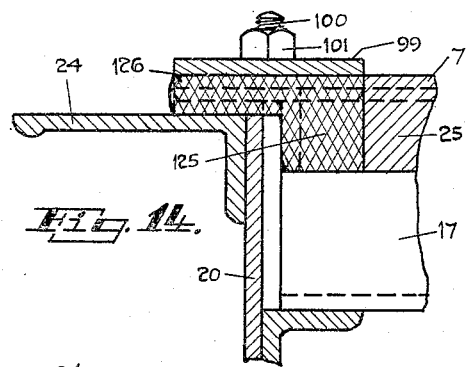
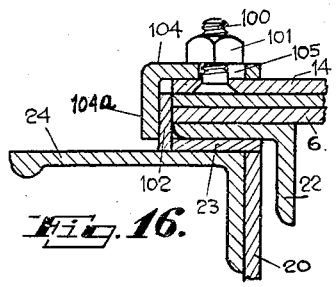
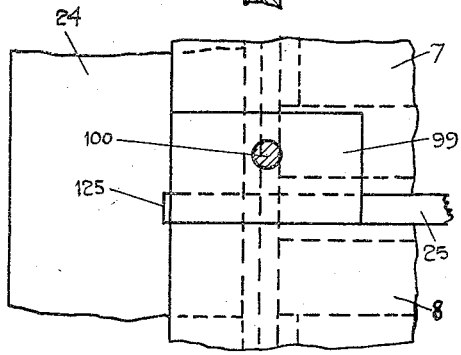
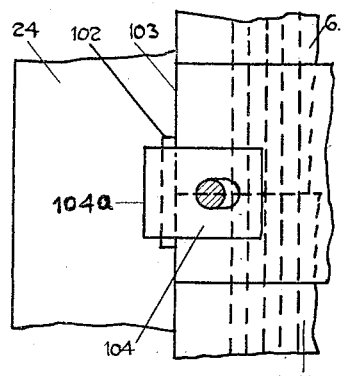
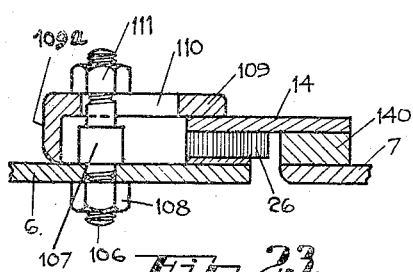
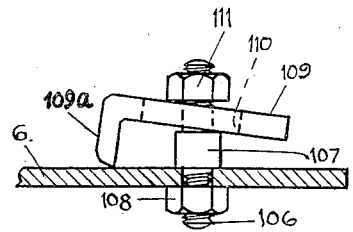
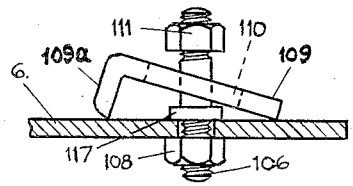

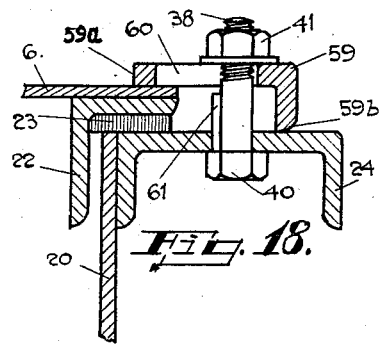
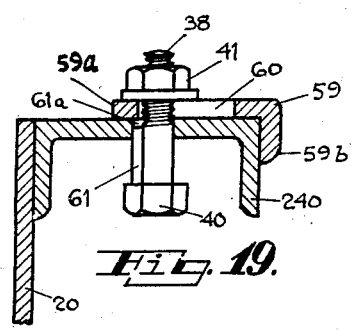
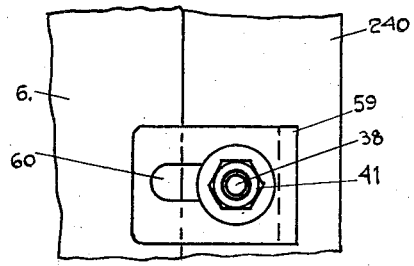
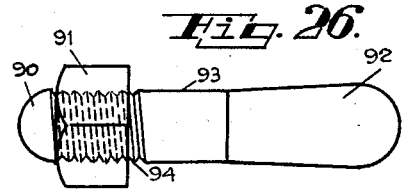
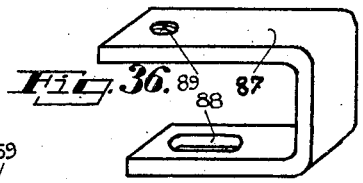
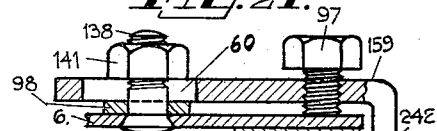
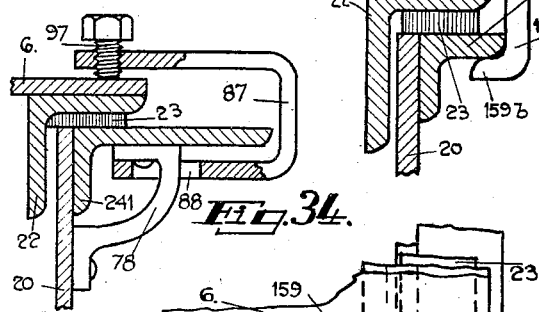
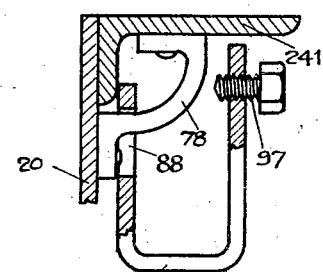
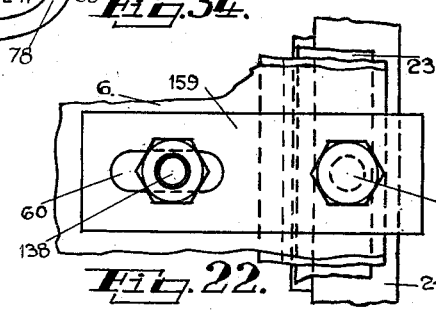

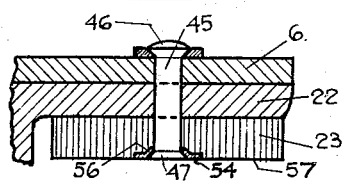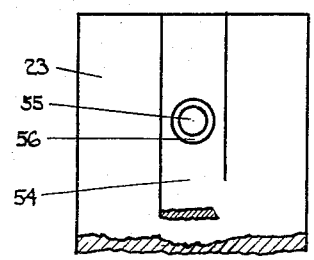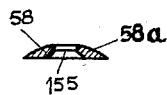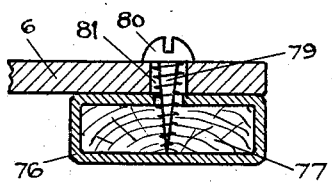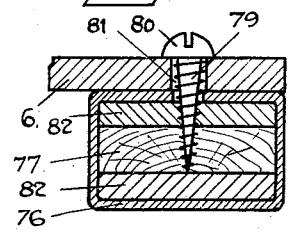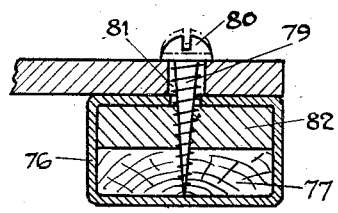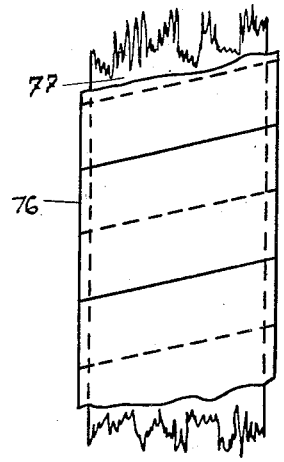

Patented Sept. 1, 1931

1,821,595

UNITED STATES PATENT OFFICE

EDWARD ELIAS von TELL, OF GOTENBORG, SWEDEN

COVER FOR SHIPS' HATCHWAYS

Application filed January 21, 1931, Serial No. 510,245, and in Great Britain January 29, 1930.

This invention relates to covers for the hatchways of ships and more specifically to covers of the kind which consists of metal plates reinforced by angle bars or bulb angles and divided into sections which are hinged to one another in such a way that the sections can be folded together when the cover is to be removed or replaced.

Usually no other metal than mild steel is used in the construction of ships' hulls both for plates and also for bars, and hence said plates and bars hereinafter are referred to as steel plates and steel bars but without in any way limiting the invention to said particular metal.

The main object of this invention is an improved hatch-cover of the class mentioned adapted to form a reliable watertight closure for the hatchway without requiring tarpaulins or similar accessories. A further object of my invention is a hatchway cover of the class mentioned in which especially those points are easily made fully watertight where two or more joints meet, such cross points always being exceedingly difficult to seal. Another object of my invention is to provide means for a comfortable operating of large and heavy steel covers when opening or closing the hatchway. Still another object of the invention is to provide means enabling the covers, when removed from their seating above the hatch coamings, to remain connected with the hatch coaming without interfering with the free access to the hatch way for loading or unloading the holds. Also an object of this invention is to provide a packing means which is cheap to procure and to repair as well as reliable in operating.

Constructional examples of the invention will now be described with reference to the accompanying drawings, in which Fig. 1 illustrates diagrammatically a side elevation of a ship's hatchway with the improved foldable cover removed, the foldable cover being shown at the right hand end of the hatchway as positioned somewhat differently to the cover at the left hand end of the same hatchway, Fig. 2 is a plan view of the same hatchway with the cover on its seating above the hatch, Fig. 3 is an elevational view on an enlarged scale similar to that in Fig. 1 but showing only the left hand portion of the hatch coaming with its appropriate foldable cover removed and designed somewhat differently to the cover in Fig. 1, Fig. 4 is a diagrammatical perspective view of a portion of a ship's deck with a hatchway during the removing (or replacing) of the improved foldable covers, Fig. 5 is a side elevational view on a slightly enlarged scale of the hatchway with closed covers, the front plating of the hatch coaming being broken away in the right hand portion of the figure, Fig. 6 is a complete plan view of the hatchway with covers as in Fig. 5, Fig. 7 is a longitudinal broken vertical section through the right hand section of the cover in Fig. 5, the adjacent portion of the left hand cover section being also visible.

Figs. 8 to 11 inclusive and Figs. 14, 16, 18, 21, 23 are vertical sections of various forms of tightening cleats for the covers, Fig. 12 shows the same cleat as in Fig. 11 but released and the cover removed, Fig. 13 is a plan of the cleat shown in Fig. 11, Fig. 15 is a plan of the cleat shown in Fig. 14, Fig. 17 is a plan of the cleat shown in Fig. 16, Fig. 19 shows the same parts as in Fig. 18 with the cover removed, Fig. 20 is a plan view of the same parts as in Fig. 18, Fig. 22 is a plan view of the embodiment shown in Fig. 21, Fig. 24 shows the same parts as in Fig. 23 but with cover removed, Fig. 25 shows the same parts as in Fig. 24 but in another operative position, Fig. 26 shows on an enlarged scale the pin for hinge 11, Fig. 27 shows on somewhat the same enlarged scale a sectional elevation of the border portion of the cover with a yielding packing, illustrating the attachment thereof, Fig. 28 is a plan view of the parts shown in Fig. 27, Fig. 29 is a cross section through a washer for the attachment means in Fig. 27, Fig. 30 shows on an enlarged scale a section through an improved packing means for the joints, Figs. 31 and 32 show similar sections through two modifications of such packing means, and Fig. 33 shows a plan view of a broken part of the packing means according to any of the forms shown in Figs. 30-32.

Figs. 34, 35, 36 are various views of a further embodiment of the cleat.

In the drawings the ship's deck is indicated at 1 and the hatchway at 2. The latter is as usual built up of steel plates reinforced with bulb angles or other stiffening bars. In order to meet the special stresses acting upon the thwartship ends of the hatchway from the covers (as will be understood from the following description) it is preferable to provide special brackets or supports 3 at said ends which supports may be, and preferably are, designed as stanchions or benches 4, as shown in Figs. 1 and 2, the purpose of which will be explained later on.

According to Fig. 2 the whole cover comprises four sections 5, 6, 7, 8, of which the section 5 is hinged to the one end 9 of the hatchway and the section 8 to the opposite end 10 of the same hatchway. The hinges for said sections are designated with 11 for either ends, and are shown more in detail on the right hand in Fig. 7. The section 6 is hinged to section 5 by means of hinges 12, and section 7 hinged to section 8 by means of similar hinges 12 which hinges also are more clearly shown in the middle of the aforesaid Fig. 7. The sections 6 and 7 meet each other at the half length of the hatchway, and their joint 13 is shaped as clearly shown on the left hand in Fig. 7 by overlapping for instance by joggling the edge of section 7 so as to engage the straight edge of section 6. In lieu of joggling the plate section 7 itself may be preferable to attach a narrow flat steel 14 along the edge of the section 7, and form the joggle in said flat steel, as shown in Figs. 7 and 16.

The hinges 11 and 12 can be designed in any convenient way as easily understood by everybody experienced in standard ship building practice; for instance said hinges may consist of flat steels or angle bars, riveted to the cover and hatchway plates. Preferably the pin 90 for the hinge 11 will be made such as shown in Fig. 26, viz. screw threaded in the one end 94 provided with a nut 91, and with a slightly tapered head 92 with round end in the rear end leaving a cylindrical between portion 93. As shown in Fig. 26 the end of the screw threaded portion 94 also may be rounded for the purpose explained elsewhere here below. When the pin 90 joints the two parts of the hinge its cylindrical portion 93 snuggly fits the cylindrical bore in the stationary hinge part, while its tapered end 92 passes through the bore 95 in the cover part of the hinge with some play because of the said bore having a diameter slightly less than the biggest diameter of the tapered head 92. The effect of that will be clearly explained later on.

In Fig. 1 and 2 all the sections 5—8 are shown as of substantially equal width, but in Figs. 3-6 the two intermediate sections 6 and 7 have a larged width than the two end sections 5 and 8. The object of this modification will hereinafter be explained.

In all respects the cover sections as well as the hatchway proper are built up in accordance with standard ship building practice as far as concerns the thicknesses of the various parts, profiles and distribution of strengthening bars and similar members, as will be clearly understood from the drawings by everybody skilled in this art, so that there will be no need to describe all the figures in detail. In order to get rid of all obstacles to the free access to the hatchway when the covers are removed, the usual removable hatchway beams are substituted by bulb or other angle bars of requisite dimensions riveted to the cover plating at such places where said bars can serve as stiffening members. Such parts are for instance those shown in the drawings at 15, 16, 17, 18, 19, 21 and 22 respectively.

The material feature of this invention is that the hinged cover is adapted to close the hatchway in a fully reliable watertight manner, so that it will fulfill entirely the requirements of the board of trade and similar institutions without requiring tarpaulins to be stretched and tightened over the cover. Such a watertight closing of the cover proper requires the application of packing at all such weather joints through which water can enter especially those points where longitudinal and transverse joints are met, as well as means to compress said packings, whereby said closing means must be easy to manipulate when uncovering the hatchway as well as when closing it.

The packings can be made up of various materials, and I do not limit myself to any special kind. Neither do I limit my invention to any special method of applying said packings nor to the means for compressing same. In the accompanying drawings I have given some examples merely to illustrate how my invention can be carried out, and it is to be noted that other materials and packing devices, if suitable, may be substituted.

The packings, however, must be applied all round the opening of the hatchway, that is, along the two side coamings 20 and along the two end coamings 9 and 10; further, along the separable thwart joint 13 between the two intermediate cover sections 6 and 7 and along the non-separable thwart joints between sections 5 and 6 on the one side and between sections 7 and 8 on the other side. As mentioned, special attention must be given to such points where a longitudinal joint meets a thwart ship joint, viz. where the joints between sections 5 and 6, and between sections 7 and 8 meet the joint between the cover and the top of the two side coamings 20, as well as where the separable joint 13 between sections 6 and 7 meets the aforesaid joint along the top of the two side coamings 20.

The packings may be made of rubber in the form of somewhat thin pads. But they can equally well consist of similar pads of hemp braids or also of wooden strips, or of any other convenient and suitable material. In Figs. 30–33 very cheap and nevertheless extraordinary good and reliable packing means are illustrated. In all said figures the packing comprises a wooden lath 77 covered with canvas 76. In Fig. 31 a layer 82 of rubber or similar yielding material is applied at the one side of the wooden lath within the common canvas covering 76, and according to Fig. 32 layers 82 of such yielding material are arranged on both sides of the lath 77. In Fig. 33 the canvas covering 76 is shown in the form of narrow strips wound in spirals around the lath 77 and the yielding layers 82 when present.

Packings of the type here described are inexpensive to procure and in case the wooden core 77 should be broken it can be readily replaced anywhere. A further advantage of the packing consists in the fact that, when wet the wood 77 as well as the canvas 76 swell, thus increasing their thicknesses and the tightness of the packing. As the hatchway cover packings must be tight especially in bad weather with heavy rain and seas washing overboard, that is when the cover is soaked, the improved packings are extremely advantageous as their effect will be improved automatically exactly as required.

The lath 77 may be made of soft wood such as pine or fir free from knots, and the canvas 76 should not be impregnated in order that it may take up moisture or water so as to swell.

The said packing strips can be secured to the underside of the cover 3 by means of wood-screws 79 fastened in the wooden lath 77 and passing freely through holes 81 in the cover plate 3, and prevented from falling through by their heads 80. When tightening the joint so as to compress the packing strands, the screws 79 rise freely in the bores 81, so that their heads 80 are lifted a little above the cover plate 3, as indicated by dotted lines in Fig. 31.

The packings are attached either to the cover or to the hatchway, so that they will remain in their proper place also when the cover is opened up, and will not be detached and lost. In one way of securing the packing pads they may be fixed to the steel skeleton by screws the heads of which are countersunk into the pads so far that they remain below the tightening surface proper when the packing becomes set. Figs. 27 to 29 inclusive illustrate an example of such a fastening for the packing. In said figure the cover section is designated with 6, its reinforcing angle iron with 22 and the packing with 23 just as similar parts are marked elsewhere in this description. The packing 23 is supposed to comprise a ribbon of compressible rubber and its attachment comprises a series of rivets 45 (a single rivet only is shown) going through the three layers 23, 22 and 6 and provided with a countersunk head 47 on its down end and a hammered countersunk point 46 on its upper end.

To prevent the heads 47 of the rivets 45 from submerging into the soft rubber 23 a metal washer must be applied therebetween. Said washer in Figs. 27 and 28 is designed as a metal strip 54 with punched holes 55 for the rivets 45, whereby the rands of the holes 55 are forced upwards, when looked in the operative position in Fig. 27, so that a conical seating 56 is formed around the rivet head 47 which seating countersinks into the soft rubber 23 when tightening the rivet (see Fig. 27) thereby leaving an even surface on the down surface 57 of the packing means.

In lieu of the strip shaped multibore washer 54 a separate metal washer 58 can be provided for each rivet 45, each washer pierced through by a single conical bore 155 adapted to receive the tapered rivet head 47. These single washers 58 may have a comparably large thickness and the surface 58a which, when operative faces the rubber 23 ought to be ball shaped in order to protect the rubber 23 from being cut or otherwise injured when tightening the rivet 45.

From Figs. 7–12, 16, 18, 21, 22, 27, 28 and 34 it can be seen that the packing along the board sides of the cover sections 5—8 comprises a pad 23 which is secured in any convenient way, for instance to the underside of the upper flange of the steel angle 22 which constitutes the stiffening member along the board sides of the cover sections 5—8, and which flange is riveted to the underside of the respective cover section. The seating of said pad on the hatchway, when the cover is closed, comprises an angle bar or bulb angle 24 which runs along the edge of the hatch coaming at the top thereof. Along the fore and after ends 9 and 10 of the hatchway similar pads 23 can be applied as illustrated in Fig. 7, right hand side.

In Fig. 7 in connection with the thwart joint between the cover sections 7 and 8 there is applied a vertical packing pad 25 between the two downward directed flanges of the reinforcement angle bars 17, 18 which packing pad will be compressed in the direction of the bent arrow I, when the cover section 7 gets lowered down, tilting about the hinge 12. Exactly the same art of packing may be applied between the cover sections 5 and 6 where they meet, and therefore it is no need of a special figure to show the last mentioned joint. The pad 25 can be secured either to bar 17 or to bar 18, Figs. 7 and 14.

Where the cover sections 6 and 7 meet each other along the free joint 13 a packing pad 26 is disposed between the upper side of cover section 6 and the under side of the metal strip 14, which, as mentioned above, is riveted to cover section 7 upon an interposed metal strip 140 and shown in Figs. 7 and 23-25.

As mentioned before the places where the transverse joints between the cover sections 5 and 6, 6 and 7 as well as 7 and 8 meet the longitudinal joints between the cover and the side coamings must receive special attention in order to be kept watertight. This can be accomplished by various means of which a few examples are shown in Figs. 14 to 18 inclusive.

Before describing said devices, however, it must be pointed out how the cover sections in general are held watertight against the hatch coaming. For this purpose means adapted to compress the packing pads must be used, and in the drawings some examples are illustrated in Figs. 8, 9, 11-13, 18-22 and 34-36.

In Fig. 8 a pivoted cleat 27 can turn loosely about a pin 28 secured in a vertical position to the horizontal flange of the bulb angle 24 by means of a nut 29 bearing against the underside of said flange and working upon the reduced screw-threaded lower end 30 of said pin, whereby the shoulder between the reduced end portion 30 and the main body of the pin 28 makes a seat against the upper side of the flange of the bulb angle 24, so that the pins 28 can be stationarily secured in position by tightening their nuts 29. The top portion of each pin 28 also is threaded and projects above the corresponding cleat 27, so that a nut 31 can be screwed thereon down against the cleat. When it is desired to make a watertight closure of the cover, the cleats 27 are turned about their pins 28 until their projecting arms 32 lie over the cover as shown in Fig. 8, whereupon the nuts 31 are successively tightened by means of a spanner, thus compressing the packing and preventing the unintentional removing of the cleats.

In Figs. 11 to 13 double armed clamping irons 33, 34 are shown which when operative rest with their one arm 33 against the upper side of the border portion of the cover section 6 and with their opposite arm 34 against an oblong iron piece 84 riveted to the upper side of the horizontal flange of the reinforcement bulb angle 24. The height of iron piece 84 is somewhat equal to the total height of the cover section 6 above the said bulb iron flange. A screw bolt 38 with head 40 and nut 41 secures the clamping iron 33, 34 to the bulb iron 24 in such a way that said clamping iron can be swung about the screw bolt 38 when nut 41 is slackened. A cross pin 85 passes through the screw bolt 38 below the nut 41 in front of a groove 86 at the underside of clamping iron 33, 34 in such a way that when tightening the nut 41 the pin 85 gets pulled into said groove if preparatory the screw bolt has been turned so that said pin is parallel to the groove 86. By this means the screw is prevented from turning as the clamping iron be forced down upon the cover section to tighten this one against the hatchway coaming.

When the cover is to be removed, the clamping iron 33, 34 will be released by slackening the nut 41, and pivoted around the screw bolt 38 until it comes parallel to the oblong iron piece 84, whereupon the clamping iron can be lowered down into the interspace between said iron piece and the hatch way coaming as shown in Fig. 12 and with dot-and-dash lines in Fig. 13 and thus protected from blows of the cargo when loading or unloading the hatch.

Similar cleats 35 turning on pins 36 are shown in Figs. 5-7 for tightening the joint 13 between cover sections 6 and 7.

In Fig. 9 the pivoted cleats are replaced by brackets 37 riveted to the cover section 6 for example, but a similar cleat, of course, could be used with any other cover section 5, 7, 8. When the cover is closed, the brackets 37 are secured to the bulb angle 24 by means of screw bolts 38, inserted through sufficient large holes 39 in the horizontal flange of said bulb angle, and tightened between the bolt head 40 and a nut 41 which can be manipulated with a usual wrench.

The last mentioned tightening device has the advantage relatively to the pivoted cleats, that it affords also an anchoring of the two opposite side coamings 20, thus replacing the anchoring bolts which generally are used in the ends of the removable hatch beams of the standard type.

Fig. 10 illustrates a modification of the device in Fig. 9 applicable as an anchoring means only, but not as a tightening member. This device is similar to the bracket in Fig. 9 in all respects, with the only exception that the tightening screw bolt 38 is replaced by a plain rivet 42 secured to the bracket 37, and adapted to be passed into the large hole 39 in the bulb angle 24. This device, of course, must be assisted elsewhere by cleats 27—32 or such like for effecting the tightening, and can only suitably be used in one or two pairs on opposite sides of the hatchway. The holes 39 must be somewhat large in the embodiments shown in Figs. 9 and 10 to compensate for inaccuracies in the dimensions of the cover sections or in the distance between the two opposite side coamings.

Figs. 18–22 and 34–36 illustrate some further examples of the tightening cleats for the border portions of the cover sections 5–8. In Figs. 18 to 20 a rather simple means is illustrated comprising an angularly bent clamping iron 59 and a screw bolt 38, which latter passes through a circular bore in the channel bar 240 and an oblong hole 60 in the horizontal branch 59a of the clamping iron 59. The circular bore in the channel bar 240 may be provided with a groove 61a adapted to receive a pin or key 61 on the bolt 38 so as to prevent said bolt from rotating within said bore.

When in operative position, tightening the cover 6 the bolt 38 is raised until its head 40 contacts with the underside of channel bar 240, and the clamping iron 59 is laid with its long horizontal arm 59a above the cover 6 and with the edge of its short vertical arm 59b resting against the upper side of channel bar 240 (Fig. 18). When the nut 41 of the bolt 38 is tightened the long horizontal arm 59a of clamping iron is pressed down on cover 6, thereby compressing the packing 23 between cover and hatch coaming, until the requisite tightness is obtained.

When the cover 6 is to be removed, nut 41 is slacked up, and the clamping iron 59 pushed outwards, which movement is made possible on account of the oblong hole 60 in the long horizontal arm, and this movement is continued until said long arm has released the edge of cover 6. When extending said outward movement of the clamping iron sufficiently, its vertical arm 59b leaves the channel bar 240 with the consequence that the clamping iron drops down with the horizontal arm in contact with the channel bar 240 as shown in Fig. 19, so that the screw bolt 38 also drops down as far as its nut 41 allows. The pin or key 61 ought to be of such a length that it does not pass below the channel bar 240 in the lowest position of the bolt (Fig. 19), so that the screw bolt is always secured against rotation.

The dropping down of clamping iron 59 and screw bolt 38 according to Fig. 19 effectively clears the upper edge of hatch coaming 20 from upstanding obstacles when loading or unloading the hold through the hatchway.

Another embodiment of a somewhat better effect is shown in Figs. 34 to 36, viz. a cleat which, when idle, can be pushed away so far that it does not interfere with the free access to the hatchway. Between the underside of the horizontal flange of the reinforcing angle bar 241 and the outside of the hatch coaming 20 a plurality of forged brackets 78 are riveted to said parts. A U-shaped clamping iron 87 is applied to each of said brackets 78 by means of an oblong hole 88 in its one branch and in its opposite branch provided with a screw threaded bore 89 in which a set screw 97 can be forced down against the cover section 6 when the cover is closed, and said clamping iron 87 laid around the edge of angle bar 241 and cover section 6 such as visible in Fig. 34. When the cover is to be removed, the screw 97 is released and the clamping iron pushed away so that it will free the cover. Thanks to the attachment of the clamping iron 87 on the bracket 78 the clamping iron now drops down as seen in Fig. 35 taking in such a position below the angle bar 241 that no obstacles above said angle bar prevent the free access to the hatchway.

Sometimes it is preferred to fully release the hatch coaming from the clamping irons and their screw bolts, in which cases these parts are secured to the cover proper instead of to the hatch coaming. Figs. 21, 22 show such a modified arrangement, in which the clamping iron 159 anchored to the cover 6 by means of upwardly projecting stud 138 riveted to the cover plate 6 and provided with a nut 141. Stud 138 passes through an oblong hole 60 in clamping iron 159 and the nut 141 prevents the clamping iron 159 from being unintentionally removed off the cover 6. Further the vertical short arm 159a of clamping iron 159 is extended below the horizontal flange of the reinforcing angle bar 242 and bent inwards to form a hook 159b which anchors the clamping iron to the angle bar when pushed inwards in operative position guided by the stud 138.

The clamping screw 97 is screwed through a screw-threaded hole in the horizontal arm of the clamping iron, and, when in operative position, is pressed against the upper side of the cover 6, thereby forcing the hook 159b upwards against the underside of the horizontal flange of angle bar 242 and giving the desired clamping effect upon the packing material 23.

To prevent the clamping iron 159 from loosely swinging about the stud 138 when free, a washer 98 may be applied below the clamping iron, and said iron tightened against this washer by means of the nut 141 when inoperative, and thus secured in its proper position.

The aforesaid dangerous tightening places at the meetings of longitudinal and transverse joints are marked with B and C on the one side of the cover in Fig. 6, and, of course, exactly similar places are present on the opposite side of the hatch. Figs. 14, 15 show, as one example how the tightening can be performed at such places B, and Figs. 16, 17 show an example of the tightening at places C. In Figs. 14, 15 it is visible how the vertically disposed packing pad 25 between the two cover sections 7 and 8 (respectively cover sections 5 and 6) is continued at the both ends of a vertically disposed packing piece of some yielding material, cut to the recessed shape shown in Fig. 14 and projecting outwards beyond the longitudinal joint against the top side of hatch coaming 20. The upper portion 126 of the packing piece 125 is bent down above the cover plate 7 and riveted or in any other suitable way secured to the underside of a metal washer 99 which is passed through by a stud 100 secured to the cover plate 7 and provided with a nut 101. When tightening the nut 101 washer 99 will be forced upon the packing piece 125—126 and compress same so as to make a watertight joint against the coaming 20 and reinforcing bulb angle 24 as well as against the packing pad 25, thus tightening the crossing B.

When removing the cover section 7 the packing piece 125 remains secured to said cover section so that it will not be lost. It is preferred to slack the nut 101 before removing the cover section 7 in order to release the packing stress.

Figs. 16, 17 show the tightening at crossings C between the transversal junction of cover sections 6, 7 and the longitudinal joint against the hatch coamings 20. A vertical patch 102 of some yielding packing material is applied against the side edges 103 of the two cover sections 6, 7 closing the end of the joint between them as well as against the upper side of the bulb iron 24. A flanged metal washer 104 with its vertical flange 104a retains the packing patch 102 against said cover edges 103, when its horizontal flange is secured to the plate 14 by means of a stud 100, passing through an oblong hole 105, in said horizontal flange. When tightening the joint, washer 104 is pushed inwards (to the right hand in Fig. 16) for instance by slight hammer blows on the vertical flange 104a, compressing the packing patch 102 against the cover section edges 103, whereupon the washer gets secured by tightening down the nut 101. The packing patch 102 may be secured to the flange 104a in any convenient way so as to prevent it from being lost when releasing the joint.

In Figs. 23–25 a clamping means for the transversal joint between cover sections 6 and 7 is illustrated as a substitute for the cleats 35 and screw bolts 36. A stud 106 screw threaded in both ends and provided with a thicker intermediate portion 107 is secured to the cover section 6 between the thicker portion 107 and a nut 108. An angle bent clamping iron 109 is applied upon the upper portion of stud 106 which passes through the horizontal branch clamping iron 109 in an oblong hole 110 therein. The clamping iron 109 rests with its down bent vertical branch 109a against the cover section 6 and with its horizontal branch upon the iron 14 of cover section 7.

When tightening the nut 111 the clamping iron is forced against iron 14 of cover section 7 and compresses the packing 26 against cover section 6 (see Fig. 23). When removing the cover section 7 the nut 111 is slacked away and clamping iron 109 pushed to the left hand in Fig. 24 sliding on the stud 106 by means of the oblong hole 110, and falls down tilting around the edge of vertical flange 109a until the thicker portion 107 prevents a further tilting (see Fig. 24). If now nut 111 is tightened, the clamping iron 109 remains in said position even when the cover section 6 is removed from the hatch coaming.

Fig. 25 shows a modification of the embodiment in Figs. 23, 24, whereby the shoulder portion 117 is made narrower so that, when idle, the free end of the horizontal branch of clamping iron 109 gets supported by the cover section 6 proper.

Fig. 4 illustrates the operation of the covers. Supposing that the hatchway is closed by the cover and is to be opened up, the first operation is to release all the cleats 27, 32 or the equivalent members such as brackets 37 and clamping irons 109 or the like. From the main barrel 63 of the ordinary cargo winch 62 the hoisting wire 64 is passed around the sheave 66 at the top of the derrick 65 and down to the cover, where it is hooked to a ring 67 at the free edge of the cover section 7.

Another wire 68 is passed around one of the auxiliary end drums 69 of the winch 62 over a sheave 70 on the mast 71 and down to the cover, where it is divided in two parts 72, which are hooked each to a ring 73 at the same edge of the cover section 7 as the aforesaid ring 67 but on opposite sides thereof. When revolving the winch shaft the end drum 69 winds up the wire 68, so that the cover section 7 is raised about its hinges 12, and the wire 64 is wound simultaneously on the barrel 63, so that, when the section 7 has reached such a raised position, that it tends to fall down on its rear side upon the still stationary section 8, the wire 64 is ready to take up the load of the cover section 7 preventing it from falling down too suddenly or causing shocks on the hoisting appliances. When the cover section 7 thus has been lowered down gently upon the stationary section 8, the wires 64 and 68 are both shifted to rings or holes in the bulb angle 17, which are not specifically shown in the drawings but may be clearly understood from the left hand portion of Fig. 4, where the wires 64 and 68 are shown hooked to the junction between the folded sections 5 and 6. Now the two sections 7 and 8 will be raised together around the hinges 11 at the edge of section 8 until one of the final positions shown in Figs. 1 and 3 and the left hand portion of Fig. 4, has been reached.

The said three final positions of the removed cover differ in the position of the intermediate cover sections 6 and 7. In Fig. 1 said intermediate cover sections have the same width as the two outer cover sections 5 and 8, hence the removed sections can be placed either as shown in the left hand portion of said figure with the intermediate cover section 6 resting at its outer lower edge upon the stanchions or benches 4, whereby the folded cover is in a raised position like a wall, or the end of the outer section, for instance that of the right hand section 7, will be placed against an inwardly sloping bench 400 (see Fig. 1) where it will slide downwards—inwards, allowing its jointed portion 8 to take in also a sloping position and thus reducing the total height of the cover sections when removed from the hatchway which will be convenient for the man in charge of the winch.

In Fig. 3 as also in Fig. 4 the intermediate cover sections 6 and 7 are of a larger width than the two outer sections 5 and 8, whereby the difference in width depends on the height of the hatch coaming, so that when raised into the position illustrated in Fig. 3 the sum of the height of the hatch coaming and the width of the cover section 5 (or 8) equals the width of the corresponding intermediate section 6 (or 7 as the case may be). By that arrangement the removed cover can be placed vertically with the wider intermediate sections 6 and 7 resting directly on the deck close to the corresponding end coamings 9, 10 respectively.

The unequal width of the two cover sections 5 and 6 or 8 and 7 has another advantage, viz. it facilitates the raising of the two folded sections from their horizontal position on the hatchway. In said position the upper cover sections 6 (or 7) will overhang the supporting end coaming 9 (or 10) with that portion, which corresponds to the difference in width between the two sections 5 and 6 (or 8 and 7), whereby said overhang serves as a counterweight assisting the tilting of the cover sections about the hinges 11.

In raised position according to either of the positions shown in Figs. 1, 3 and 4, the lower end of the intermediate sections 6 and 7 can be temporarily secured to the deck 1 (or the benches 4 or 400) by screw bolts or pins 74 inserted through holes in said cover sections and holes registering therewith in an anchoring angle 75 fastened to the deck 1 or the benches as the case may be, or by means of adequate fixtures.

When closing the hatchways the operations of the winch 62 and its wires are reversed, so that the folded cover sections at first are lowered down upon the coamings, and afterwards the intermediate cover section 6 swung about its hinges 12, and laid down in its final position, whereupon the intermediate cover section 7 is applied and the cleats 27, 32 or other tightening members fitted and set.

As mentioned elsewhere in the foregoing parts of this description the hinges 11 may be provided with tapering pins such as examplified in Fig. 26. When tightening the hinged cover sections 5 and 8, the tapered pins 90 are forced inwards by blows of a hammer on their round ends 92 and by setting the nut 91 on the threaded end 94, thereby causing the taper of pin 90 to cooperate with the enlarged hole 95 in hinge 11 like a wedge so as to force down the hinged edge of cover section 8 (or 5 as the case may be) against the hatch coaming, compressing the packing 23.

In several of the figures showing details of the clamping means, the cover section is designed with reference Figure 6, but, of course, similar means are appliable for the other cover sections 5, 7 and 8 also.

Though I have shown and described hatchways with two pairs of cover sections, the same invention can be applied to hatchways with only one pair of cover sections or with three or more pairs, by making slight modifications in the details depending on the number of pairs of cover sections and which can easily be understood without further illustration.

Having now particularly described and ascertained the nature of my said invention and in what manner the same is to be performed, I declare that what I claim is:

1. In cover for ship's hatchways a hatchway coaming of metal plates reinforced with angle bars, a cover of metal plates hinged to the ends of the hatch coaming and subdivided in sections hinged to each other so as to be folded down, packing means between the metal cover sections and the upper edge of the metal hatch coaming, packing means at the crossings between longitudinal joints and transversal joints as well as vertical joints of cover sections and hatch coaming, and means to compress the packing means and secure the cover sections on the hatch coaming so as to ensure full watertightness all around and across the hatchway.

2. In cover for ship's hatchways a hatchway coaming of metal plates reinforced with angle bars, a cover of metal plates hinged to the ends of the hatch coaming and subdivided in sections hinged to each other so as to be folded down, some of the cover sections of a larger width than the other cover sections, packing means and clamping means for compressing same all around the hatchway where cover sections and hatch coaming meet as well as where longitudinal and transversal joints meet.

3. In cover for ship's hatchways a hatchway coaming of metal plates reinforced with angle bars, a cover of metal plates hinged to the ends of the hatch coaming and subdivided in sections hinged to each other so as to be folded down, those sections of the cover which, when folded down upon those sections which are hinged to the hatch coaming ends, have their free end directed outwards off from the hatch, having a larger width than the sections hinged to the coaming so as the free ends of the first mentioned sections are overhanging the hatch coaming when folded down upon the last mentioned sections for the object to afford a counterweight when opening the cover.

4. In cover for ship's hatchways a hatchway coaming of metal plates reinforced with angle bars, a cover of metal plates hinged to the ends of the hatch coaming and subdivided in sections hinged to each other so as to be folded down, packing means between the metal cover sections and the upper edge of the metal hatch coaming, packing means at the crossings between longitudinal joints and transversal joints as well as vertical joints of cover sections and hatch coaming, said packing means comprising wooden laths surrounded with canvas, and means to compress the packing means and secure the cover sections on the hatch coaming so as to ensure full watertightness all around and across the hatchway.

5. In cover for ship's hatchways a hatchway coaming of metal plates reinforced with angle bars, a cover of metal plates hinged to the ends of the hatch coaming and subdivided in sections hinged to each other so as to be folded down, packing means between the metal cover sections and the upper edge of the metal hatch coaming, packing means at the crossings between longitudinal joints and transversal joints as well as vertical joints of cover sections and hatch coaming, said packing means comprising wooden laths and layer of some yielding material, strips of canvas spirally wound around the wooden lath and the yielding material, said packing means secured to the under side of the cover sections by means of screws freegoing through the metal cover so as to compensate for the compressing of the packing, and means to compress the packing means and secure the cover sections on the hatch coaming so as to ensure full watertightness all around and across the hatchway.

6. In cover for ship's hatchways a hatchway coaming of metal plates reinforced with angle bars, a cover of metal plates hinged to the ends of the hatch coaming and subdivided in sections hinged to each other so as to be folded down, packing means between the metal cover sections and the upper edge of the metal hatch coaming, packing means at the crossings between longitudinal joints and transversal joints as well as vertical joints of cover sections and hatch coaming, and clamping means to compress the packing means and secure the cover sections on the hatch coaming, said clamping means comprising cleats, bolts screws and clamping irons movably secured to the plating so as to be easy applied when closing the cover and protected from being missed when released.

7. In cover for ship's hatchways a hatchway coaming of metal plates reinforced with angle bars, a cover of metal plates hinged to the ends of the hatch coaming and subdivided in sections hinged to each other so as to be folded down, a cargo winch adjacent said hatch coaming having ordinary drums and auxiliary drums, a mast, a derrick on said mast, sheaves on the mast and on the derrick, hoisting wires from said winch drums over said sheaves and carried down to said cover sections, and hooks to temporarily connect said cover sections and said wires.

8. In cover for ship's hatchways a hatchway coaming of metal plates reinforced with angle bars, a cover of metal plates hinged to the ends of the hatch coaming and subdivided in sections hinged to each other so as to be folded down, and means to secure the free ends of the folded cover sections to the deck outside the hatch coaming when the cover is opened.

9. In cover for ship's hatchways a hatchway coaming of metal plates reinforced with angle bars, a cover of metal plates hinged to the ends of the hatch coaming and subdivided in sections hinged to each other so as to be folded down, means to guide the folded cover sections when opened so as the cover sections hinged to the hatch coaming are caused to take in an outwardly sloping position for the purpose to reduce the height of the folded cover sections when opened.

10. In cover for ship's hatchways a hatchway coaming of metal plates reinforced with angle bars, a cover of metal plates hinged to the ends of the hatch coaming and subdivided in sections hinged to each other so as to be folded down, packing means between the metal cover sections and the upper edge of the metal hatch coaming, packing means at the crossings between longitudinal joints and transversal joints as well as vertical joints of cover sections and hatch coaming, means to compress the packing on longitudinal joints and the packing on transversal joints and to secure the cover sections on the hatch coaming, and means to compress the packings at the points where longitudinal and transversal joints meet independent of the means for securing the cover to the hatch coaming.

In testimony whereof I have affixed my signature.

EDWARD ELIAS von TELL.